(12) United States Patent
Matsumoto

(10) Patent No.: US 9,781,760 B2
(45) Date of Patent: Oct. 3, 2017

(54) USER TERMINAL AND PROCESSOR FOR PERFORMING D2D TRANSMISSION

(71) Applicant: KYOCERA CORPORATION, Kyoto (JP)

(72) Inventor: Naohisa Matsumoto, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/337,831

(22) Filed: Oct. 28, 2016

(65) Prior Publication Data
US 2017/0048908 A1    Feb. 16, 2017

Related U.S. Application Data

(63) Continuation of application No. PCT/JP2015/072416, filed on Aug. 6, 2015.

(60) Provisional application No. 62/035,174, filed on Aug. 8, 2014.

(51) Int. Cl.
*H04W 76/02* (2009.01)
*H04L 1/12* (2006.01)
*H04W 92/18* (2009.01)
*H04W 72/04* (2009.01)

(52) U.S. Cl.
CPC .......... *H04W 76/023* (2013.01); *H04L 1/12* (2013.01); *H04W 72/0446* (2013.01); *H04W 72/0453* (2013.01); *H04W 72/0406* (2013.01); *H04W 92/18* (2013.01)

(58) Field of Classification Search
None
See application file for complete search history.

(56) References Cited

U.S. PATENT DOCUMENTS

2015/0049740 A1* 2/2015 Lee .................. H04W 72/1268
370/336

FOREIGN PATENT DOCUMENTS

WO    2015/115505 A1    8/2015

OTHER PUBLICATIONS

International Search Report issued in PCT/JP2015/072416; dated Nov. 2, 2015.
Written Opinion issued in PCT/JP2015/072416; dated Nov. 2, 2015.
3rd Generation Partnership Project; Technical Specification Group Radio Access Network; Study on LTE Device to Device Proximity Services; Radio Aspects; 3GPP TR 36.843 V12.0.1; Mar. 2014; pp. 1-50; Release 12; 3GPP Organizational Partners.

(Continued)

*Primary Examiner* — Sulaiman Nooristany
(74) *Attorney, Agent, or Firm* — Studebaker & Brackett PC

(57) ABSTRACT

A user terminal according to one embodiment supports D2D communication. The user terminal includes a controller configured to perform repetition of same control information using first and second control resources allocated continuously or discontinuously in a time direction, in a control region having a predetermined time length and a predetermined frequency bandwidth. The controller is configured to determine positions of the first and second control resources in the time direction such that the second control resource does not overlap with a control resource of another user terminal in the time direction, even if the first control resource overlaps with the control resource of the another user terminal in the time direction.

3 Claims, 16 Drawing Sheets

(56) References Cited

OTHER PUBLICATIONS

Qualcomm Incorporated; Details of Scheduling Assignment for D2D broadcast communication; 3GPP TSG-RAN WG2 #85 Bis; R2-141686; Mar. 31-Apr. 4, 2014; pp. 1-6; Valencia, Spain.
Ericsson; On resource allocation for communication in Mode 1 and Mode 2; 3GPP TSG-RAN WG1 Meeting #77; R1-142402; May 19-23, 2014; pp. 1-5; Seoul, Republic of Korea.
Intel Corporation; Distributed Resource Allocation for D2D Communication; 3GPP TSG RAN WG1 Meeting #77; R1-142016; May 19-23, 2014; pp. 1-8; Seoul, Republic of Korea.

\* cited by examiner

Random sequence

| 0 | 1 | 1 | 0 | 1 | 0 | 1 | 1 | 0 | 1 | 1 | 1 | 0 | 1 | 0 | 0 | 1 | 0 | 1 | 0 | 1 | 1 | 1 | 0 | 0 | 0 | 1 | 1 | 1 | 0 | 0 | 0 | 1 |

13     13     31

Skip   Skip (1, 5, 7, 13)

Time domain patterns

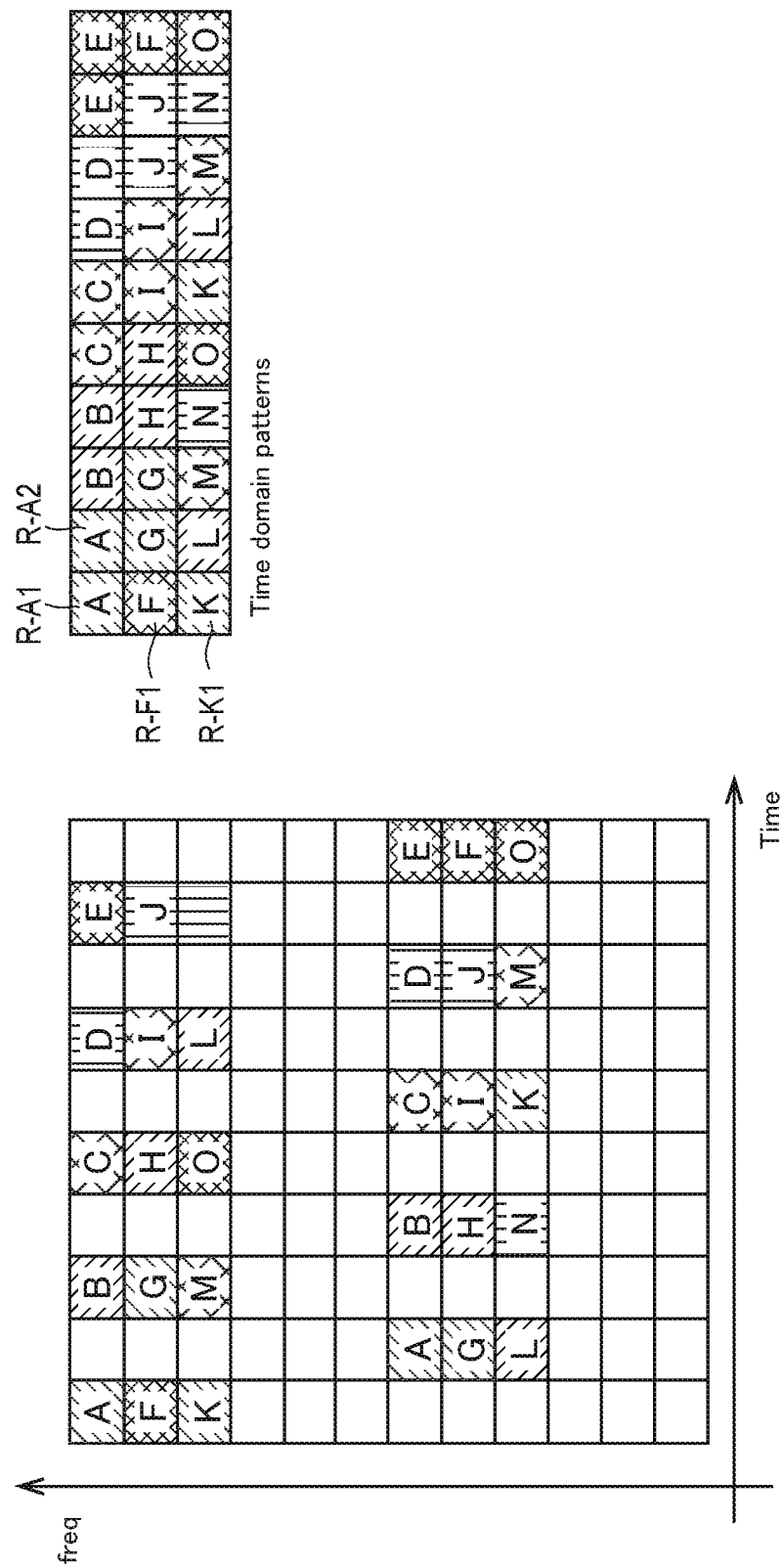

Time domain patterns

Time domain patterns

USER TERMINAL AND PROCESSOR FOR PERFORMING D2D TRANSMISSION

TECHNICAL FIELD

The present disclosure relates to a user terminal and a processor that support D2D communication in a mobile communication system.

BACKGROUND

In 3GPP (3rd Generation Partnership Project) which is a project aiming to standardize a mobile communication system, the introduction of a Device-to-Device (D2D) proximity service is discussed as a new function in Release 12 and later (see Non Patent Document 1).

The D2D proximity service (D2D ProSe) is a service enabling direct device-to-device communication within a synchronization cluster formed by a plurality of synchronized user terminals. The D2D proximity service includes a discovery procedure (Discovery) in which a proximal terminal is discovered and D2D communication (Communication) that is direct device-to-device communication.

In the D2D communication, the user terminal transmits (or receives) control information by using a control resource, and transmits (or receives) user data by using a data resource indicated by the control information. The control information is also referred to as SA (Scheduling Assignment), and the control resource is also referred to as SA resource.

Mode 1 (a first mode) and Mode 2 (a second mode) are proposed as the assignment mode of the control resource and the data resource. The Mode 1 is a base station-driven assignment mode in which the control resource and the data resource are designated from the base station. The Mode 2 is a user terminal-driven assignment mode in which the user terminal selects the control resource and the data resource from within a predetermined resource pool.

PRIOR ART DOCUMENTS

Non Patent Document

Non Patent Document 1: 3GPP technical report "TR 36.843 V12.0.1" March, 2014

SUMMARY

A user terminal according to one embodiment supports D2D communication. The user terminal includes a controller configured to perform repetition of same control information using first and second control resources allocated continuously or discontinuously in a time direction, in a control region having a predetermined time length and a predetermined frequency bandwidth. The controller is configured to determine positions of the first and second control resources in the time direction such that the second control resource does not overlap with a control resource of another user terminal in the time direction, even if the first control resource overlaps with the control resource of the another user terminal in the time direction.

BRIEF DESCRIPTION OF DRAWINGS

FIG. 9 is a diagram showing a subframe $t_k$ calculated by a calculation formula of Equation 2 according to the first embodiment.
FIGS. 11(A) and 11(B) are diagrams showing an assignment example of an SA resource when the SA region has a time length of ten subframes according to the second embodiment.
FIG. 15 shows an example of calculation of transmission subframe with M=20 according to an additional statement 3.

DESCRIPTION OF EMBODIMENTS

Overview of Embodiments

Figure 1:
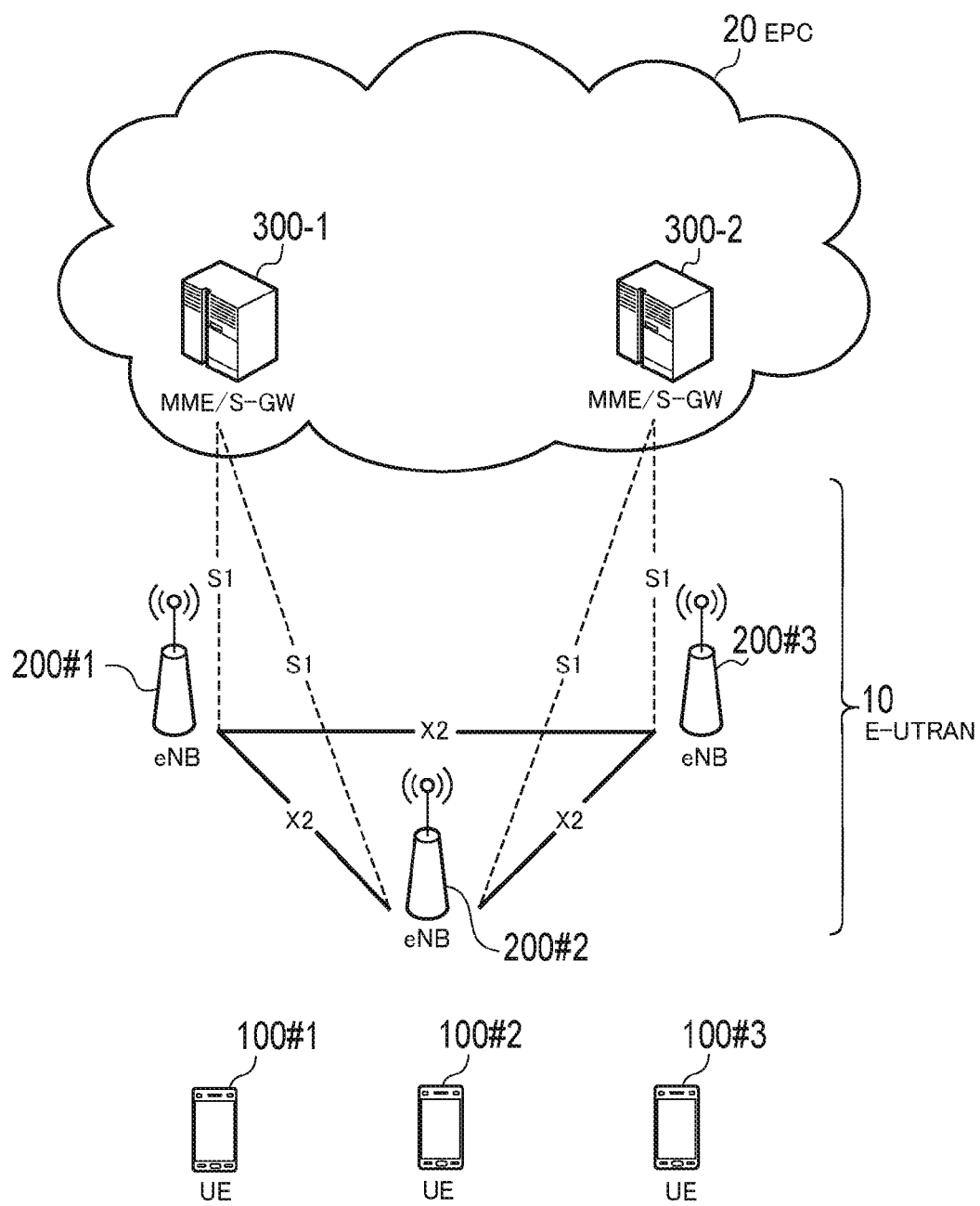
FIG. 1 is a configuration diagram of an LTE system according to a first embodiment and a second embodiment.

A user terminal according to a first embodiment supports D2D communication. The user terminal comprises: a controller configured to transmit control information to another user terminal by using a control resource and transmit user data to the other user terminal by using a data resource indicated by the control information. The control information includes an identification flag that identifies an assignment mode of the control resource and the data resource is which one of a first mode and a second mode. The first mode is an assignment mode in which the control resource and the data resource are designated from a base station. The second mode is an assignment mode in which the user terminal selects the control resource and the data resource from within a predetermined resource pool.

In the first embodiment, the control information includes time assignment information for indicating an assignment pattern in the time direction of the data resource. When the assignment mode is the first mode, the controller transmits information on a periodic assignment pattern of the data resource as the time assignment information. When the assignment mode is the second mode, the controller transmits information on a random assignment pattern of the data resource as the time assignment information.

In the first embodiment, the information on a periodic assignment pattern is information for indicating a period and an offset designated from the base station. The information on a random assignment pattern is information for indicating a pseudo random sequence.

A user terminal according to a modification of the first embodiment supports D2D communication. The user terminal comprises: a controller configured to transmit control information to another user terminal by using a control resource and transmit user data to the other user terminal by using a data resource indicated by the control information. The control information includes: time assignment information for indicating an assignment pattern in the time direction of the data resource; and an identification flag that identifies the time assignment information is which one of first information and second information. The first information is information on a periodic assignment pattern of the data resource. The second information is information on a random assignment pattern of the data resource.

In the modification of the first embodiment, the information on a periodic assignment pattern is information for indicating a period and an offset. The information on a random assignment pattern is information for indicating a pseudo random sequence.

A user terminal according to a second embodiment supports D2D communication. The user terminal includes a controller configured to perform repetition of same control information using first and second control resources allocated continuously or discontinuously in a time direction, in a control region having a predetermined time length and a predetermined frequency bandwidth. The controller is configured to determine positions of the first and second control resources in the time direction such that the second control resource does not overlap with a control resource of another user terminal in the time direction, even if the first control resource overlaps with the control resource of the another user terminal in the time direction.

In the second embodiment, the controller is configured to determine positions of the first and second control resources in a frequency direction such that the second control resource is shifted by one-half of the predetermined frequency bandwidth than the first control resource.

In the second embodiment, each of the first and second control resources has a frequency bandwidth of one resource block and a duration of one subframe. The controller is configured to: determine a first resource bock used for the first control resource and a second resource bock used for the second control resource such that the second control resource is shifted by one-half of the predetermined frequency bandwidth than the first control resource; and determine a first subframe used for the first control resource and a second subframe used for the second control resource such that the second control resource does not overlap with the control resource of the another user terminal in the time direction, even if the first control resource overlaps with the control resource of the another user terminal in the time direction.

A processor according to a second embodiment controls a user terminal that supports D2D communication. The processor is configured to execute: a process of performing repetition of same control information using first and second control resources allocated continuously or discontinuously in a time direction, in a control region having a predetermined time length and a predetermined frequency bandwidth; and a process of determining positions of the first and second control resources in the time direction such that the second control resource does not overlap with a control resource of another user terminal in the time direction, even if the first control resource overlaps with the control resource of the another user terminal in the time direction.

First Embodiment

Hereinafter, description will be provided for an embodiment in a case where the present disclosure is applied to an LTE (Long Term Evolution) system which is a mobile communication system based on the 3GPP standards.

(1) System Configuration

FIG. 1 is a configuration diagram of an LTE system according to a first embodiment. As illustrated in FIG. 1, the LTE system according to the first embodiment includes UE (User Equipment) 100, E-UTRAN (Evolved-UMTS Terrestrial Radio Access Network) 10, and EPC (Evolved Packet Core) 20.

The UE 100 corresponds to a user terminal. The UE 100 is a mobile communication device, which performs radio communication with a cell (a serving cell). The configuration of the UE 100 will be described later.

The E-UTRAN 10 corresponds to a radio access network. The E-UTRAN 10 includes eNB 200 (an evolved Node-B). The eNB 200 corresponds to a base station. The eNBs 200 are connected mutually via an X2 interface. The configuration of the eNB 200 will be described later.

The eNB 200 manages one or a plurality of cells, and performs radio communication with the UE 100 that establishes a connection with a cell of the eNB 200. The eNB 200 has a radio resource management (RRM) function, a routing function of user data, a measurement control function for mobility control and scheduling and the like. The "cell" is used as a term indicating a smallest unit of a radio communication area, and is also used as a term indicating a function of performing radio communication with the UE 100.

The EPC 20 corresponds to a core network. The EPC 20 includes MME (Mobility Management Entity)/S-GW (Serving-Gateway) 300. The MME performs different types of mobility control and the like for the UE 100. The S-GW performs transfer control of the user data. The MME/S-GW 300 is connected to the eNB 200 via an S1 interface. It is noted that the E-UTRAN 10 and the EPC 20 constitute a network of the LTE system.

Figure 2:
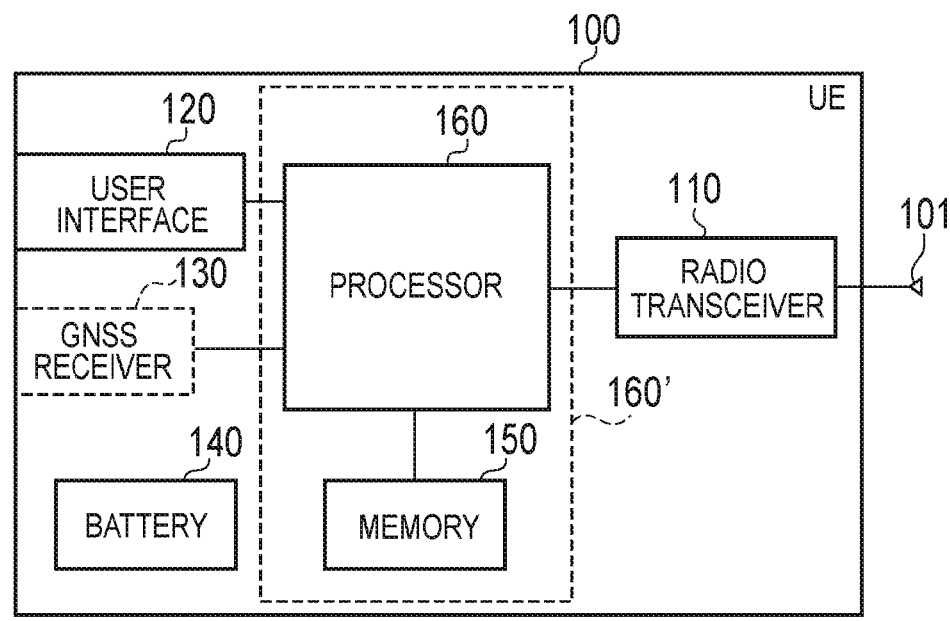
FIG. 2 is a block diagram of a UE according to the first embodiment and the second embodiment.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 and the processor 160 configure a controller. The UE 100 may not necessarily have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The radio transceiver 110 converts a baseband signal (a transmission signal) output from the processor 160 into a radio signal, and transmits the radio signal from the antenna 101. Furthermore, the radio transceiver 110 converts a radio signal received by the antenna 101 into a baseband signal (a reception signal), and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for processing by the processor 160. The processor 160 includes a baseband processor that performs modulation and demodulation, encoding and decoding and the like on the baseband signal, and a CPU (Central Processing Unit) that performs various types of processes by executing the program stored in the memory 150. The processor 160 may further include a codec that performs encoding and decoding on sound and video signals. The processor 160 executes various types of processes and various types of communication protocols described later.

Figure 3:
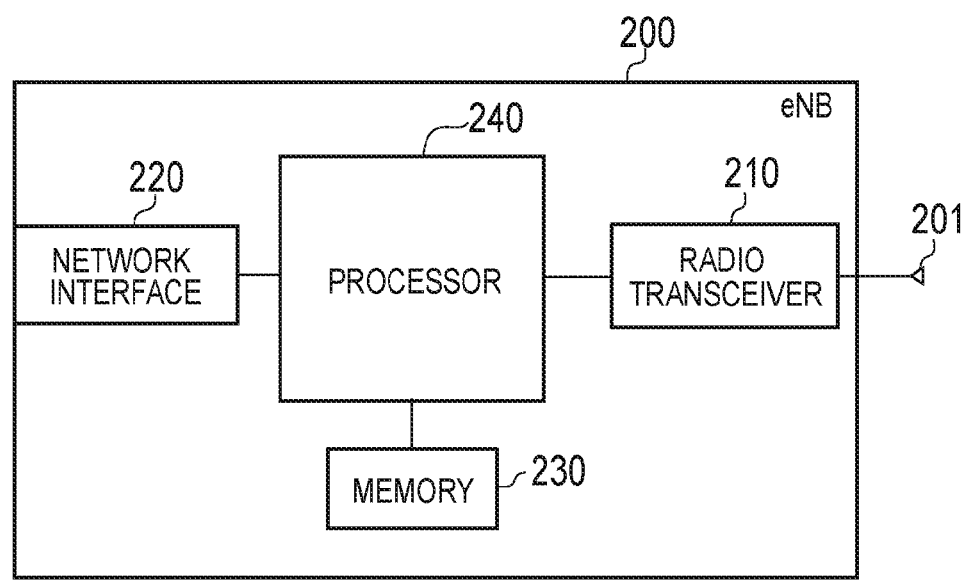
FIG. 3 is a block diagram of an eNB according to the first embodiment and the second embodiment.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 and the processor 240 configure a controller. Furthermore, the memory 230 may be integrally formed with the processor 240, and this set (that is, a chipset) may be called a processor.

The antenna 201 and the radio transceiver 210 are used to transmit and receive a radio signal. The radio transceiver 210 converts a baseband signal (a transmission signal) output from the processor 240 into a radio signal, and transmits the radio signal from the antenna 201. Furthermore, the radio transceiver 210 converts a radio signal received by the antenna 201 into a baseband signal (a reception signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for processing by the processor 240. The processor 240 includes a baseband processor that performs modulation and demodulation, encoding and decoding and the like on the baseband signal and a CPU that performs various types of processes by executing the program stored in the memory 230. The processor 240 executes various types of processes and various types of communication protocols described later.

Figure 4:
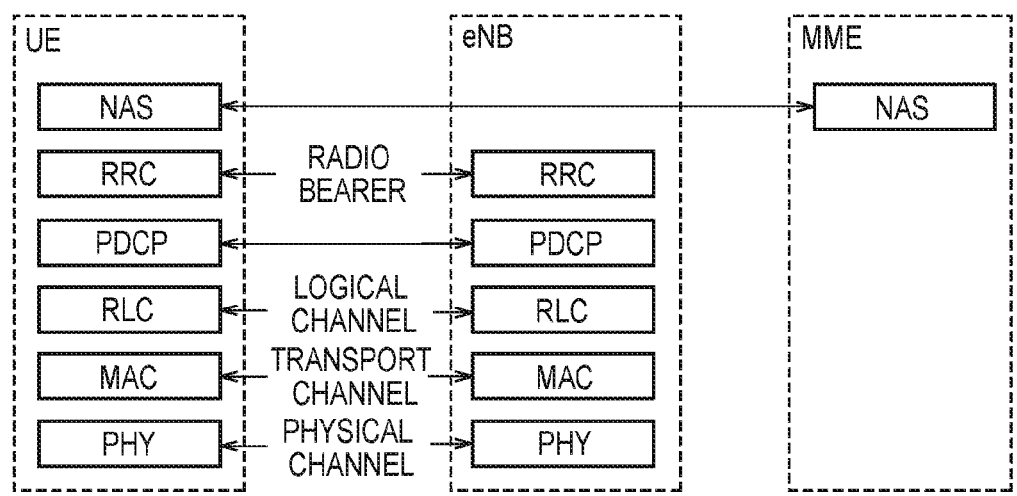
FIG. 4 is a protocol stack diagram of a radio interface according to the first embodiment and the second embodiment.

FIG. 4 is a protocol stack diagram of a radio interface in the LTE system. As illustrated in FIG. 4, the radio interface protocol is classified into a first layer to a third layer of an OSI reference model, such that the first layer is a physical (PHY) layer. The second layer includes a MAC (Media Access Control) layer, an RLC (Radio Link Control) layer, and a PDCP (Packet Data Convergence Protocol) layer. The third layer includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, user data and control signals are transmitted via a physical channel.

The MAC layer performs priority control of data, a retransmission process by a hybrid ARQ (HARQ), a random access procedure, and the like. Between the MAC layer of the UE 100 and the MAC layer of the eNB 200, user data and control signals are transmitted via a transport channel. The MAC layer of the eNB 200 includes a scheduler for determining a transport format (a transport block size and a modulation and coding scheme) of an uplink and a downlink, and a resource block to be assigned to the UE 100.

The RLC layer transmits data to an RLC layer of a reception side by using the functions of the MAC layer and the physical layer. Between the RLC layer of the UE 100 and the RLC layer of the eNB 200, user data and control signals are transmitted via a logical channel.

The PDCP layer performs header compression and decompression, and encryption and decryption.

The RRC layer is defined only in a control plane that handles control signals. Between the RRC layer of the UE 100 and the RRC layer of the eNB 200, a control signal (an RRC message) for various types of settings is transmitted. The RRC layer controls a logical channel, a transport channel, and a physical channel according to the establishment, re-establishment, and release of a radio bearer. When there is a connection (an RRC connection) between the RRC of the UE 100 and the RRC of the eNB 200, the UE 100 is in an RRC connected state. Otherwise, the UE 100 is in an RRC idle state.

An NAS (Non-Access Stratum) layer positioned above the RRC layer performs session management, mobility management and the like.

Figure 5:
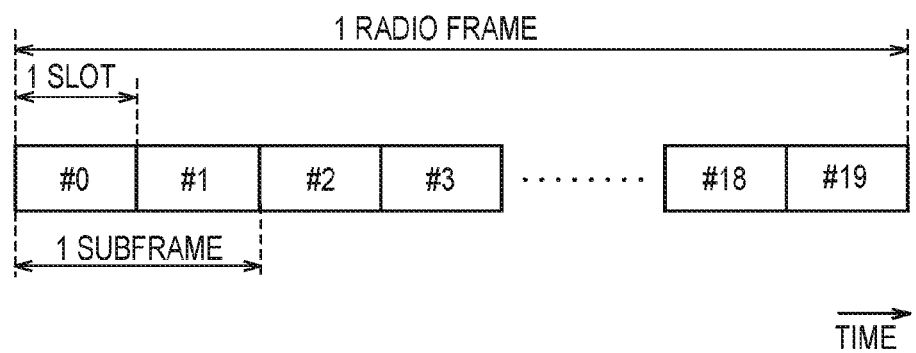
FIG. 5 is a configuration diagram of a radio frame used in the LTE system according to the first embodiment and the second embodiment.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. One symbol and one subcarrier form a one resource element. Of the radio resources (time and frequency resources) assigned to the UE 100, a frequency resource can be identified by a resource block and a time resource can be identified by a subframe (or a slot).

In the downlink, an interval of several symbols at the head of each subframe is a region used as a physical downlink control channel (PDCCH) for mainly transmitting a control signal. Furthermore, the remaining interval of each subframe is a region available as a physical downlink shared channel (PDSCH) for mainly transmitting user data.

In the uplink, both ends in the frequency direction of each subframe are regions used as a physical uplink control channel (PUCCH) for mainly transmitting a control signal. The other portion in each subframe is a region available as a physical uplink shared channel (PUSCH) for mainly transmitting user data.

(2) Overview of D2D Communication

The LTE system according to the first embodiment supports the D2D proximity service. The D2D proximity service (D2D ProSe) is a service enabling direct UE-to-UE communication within a synchronization cluster including a plurality of synchronized UEs 100. The D2D proximity service includes a discovery procedure (Discovery) in which a proximal UE is discovered and D2D communication (Communication) that is direct UE-to-UE communication. The D2D communication is also referred to as Direct communication.

A scenario in which all the UEs 100 forming the synchronization cluster are located inside a cell coverage is referred to as "In coverage". A scenario in which all the UEs 100 forming the synchronization cluster are located outside a cell coverage is referred to as "Out of coverage". A scenario in which some UEs 100 in the synchronization cluster are located inside a cell coverage and the remaining UEs 100 are located outside the cell coverage is referred to as "Partial coverage".

Figure 6:
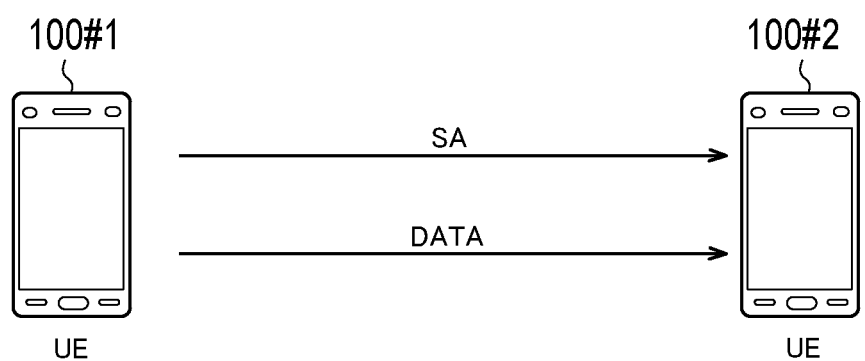
FIG. 6 is a diagram for illustrating an overview of D2D communication according to the first embodiment and the second embodiment.

FIG. 6 is a diagram for illustrating an overview of D2D communication. As shown in FIG. 6, a UE 100 #1 and a UE 100 #2 perform D2D communication. Although a two-way communication is possible in the D2D communication, description will hereinafter be provided for an example in which the UE 100 #1 is a transmission-side UE and the UE 100 #2 is a reception-side UE. It is noted that there may be a plurality of reception-side UEs, not limiting to the case where the reception-side UE is one.

The UE 100 #1 transmits SA to the UE 100 #2 by using an SA resource. The SA resource corresponds to a control resource, and the SA corresponds to control information. The SA's contents will be described later. Further, the UE 100 #1 transmits user data to the UE 100 #2 by using the data resource indicated by SA.

The UE 100 #2 receives the SA from the UE 100 #1 by using an SA resource. Further, the UE 100 #2 receives the user data from the UE 100 #1 by using the data resource indicated by the SA.

Here, one SA resource is configured by one time resource unit and one frequency resource unit. Further, one SA resource is configured by one time resource unit and one frequency resource unit. In the first embodiment, the time resource unit is a subframe. However, the time resource unit may be a slot, not limiting to the case where the time resource unit is a subframe. The frequency resource unit is one or more resource blocks.

Mode 1 (a first mode) and Mode 2 (a second mode) are proposed as the assignment mode of the SA resource and the data resource.

The Mode 1 is an eNB 200-driven assignment mode in which an SA resource and a data resource are designated from the eNB 200. For example, an SA resource and a data resource are designated dynamically or quasi-statically by dedicated signaling (PDCCH or the like) from the eNB 200 for the UE 100 #1, which uses the designated SA resource and data resource for D2D communication. The Mode 1 is believed to be especially useful in a scenario of the "In coverage" and the "Partial coverage".

The Mode 2 is a UE-driven assignment mode in which the UE 100 #1 selects a control resource and a data resource from within a predetermined resource pool. For example, the UE 100 #1 is notified of a resource pool for an SA resource and a data resource by broadcast signaling (SIB or the like) from the eNB 200, selects an SA resource and a data resource from within the notified resource pool, and uses the selected SA resource and data resource for D2D communication. Alternatively, a resource pool may be preconfigured for the UE 100 #1. The Mode 2 is believed to be especially useful in a scenario of the "Out of coverage".

(3) SA's Contents

Table 1 is a table showing SA's contents according to the first embodiment. As described above, SA is transmitted from the UE 100 #1 to the UE 100 #2.

As shown in Table 1, SA includes, "UE ID", "MCS", "Frequency position of data resource", "T-RPT (Time Resource Pattern of Transmission)", "TA (Timing Advance)", "Mode 1/Mode 2 flag", "Resource pool ID for Mode 2", "In-coverage/out of coverage", and "Hopping flag". It should be noted that the number of bits (Bits) shown in Table 1 is one example and allowed to be changed appropriately.

TABLE 1

| Contents | | Bits | |
|---|---|---|---|
| UE ID (TX UE ID or Target ID) | | 8 bits | |
| MCS | | 5 bits | |
| Frequency position of data resource (if needed) | | 13 bits | Reuse of DCI format 0 |
| T-RPT | Transmission interval(s) between transmission multiple MAC PDUs | 2 bits | 8, 10, 16, 20 |
| | Number of transmissions of a given MAC PDU (if more than one value is possible) | 1 bits | 1, 4 |
| | Resources for transmission | 5 bits | Mode 1: Offset Mode 2: $c_{init\_D2D}$ |
| TA | | 6 bits | |
| Mode 1/Mode 2 flag | | 1 bits | |
| In-coverage/out of coverage | | 1 bits | |
| Hopping flag | | 2 bits | Reuse of PUSCH Hopping |

The "UE ID" is an identifier of a transmission-side UE (TX UE) or an identifier of a reception-side UE (Target), and has the bit length of 8 bits. The "UE ID" is used to avoid decoding unintended user data in the reception-side UE.

The "MCS" is information indicating a modulation and coding scheme (MCS) that is applied to user data and has the bit length of 5 bits. For the MCS, for example, an index that is used in an uplink is substituted. It is noted that MCS that is applied to SA is fixed.

The "Frequency position of data resource" is information indicating an assignment position in the frequency direction of a data resource and has the bit length of 13 bits.

The "T-RPT" is information indicating an assignment pattern in the time direction of a data resource and has the bit length of 8 bits in total. The "T-RPT" corresponds to time assignment information. In the first embodiment, the contents of the "T-RPT" vary depending on whether the assignment mode is the Mode 1 or the Mode 2. The details of the "T-RPT" will be described later.

The "TA" is information indicating timing advance and has the bit length of 6 bits.

The "Mode 1/Mode 2 flag" is an identification flag that identifies the assignment mode is which one of the Mode 1 and the Mode 2. As described above, the Mode 1 is an assignment mode in which an SA resource and a data resource are designated from the eNB 200. The Mode 2 is an assignment mode in which the UE 100 #1 selects an SA resource and a data resource from within a predetermined resource pool.

When the assignment mode is the Mode 1, the UE 100 #1 transmits information on a periodic assignment pattern of a data resource as "T-RPT". information on a periodic assignment pattern is, for example, information indicating a period (Transmission interval) and an offset (Offset) designated from the eNB 200. When the assignment mode indicated by the "Mode 1/Mode 2 flag" is the Mode 1, the UE 100 #2 interprets "T-RPT" as information on a periodic assignment pattern of a data resource.

On the other hand, when the assignment mode is the Mode 2, the UE 100 #1 transmits information on a random assignment pattern of a data resource as "T-RPT". information on a random assignment pattern is, for example, information indicating a pseudo random sequence ($C_{init\_D2D}$). When the assignment mode indicated by the "Mode 1/Mode 2 flag" is the Mode 2, the UE 100 #2 interprets the "T-RPT" as information on a random assignment pattern of a data resource.

The "In-coverage/out of coverage" is a flag indicating whether the UE 100 #1 is inside a cell coverage or outside a cell coverage.

The "Hopping flag" is information indicating a frequency hopping of a data resource, and has the bit length of 2 bits. For the frequency hopping, a method which is similar to that of the frequency hopping of a PUSCH is reused.

(4) Assignment Example of Data Resource

Figure 7:
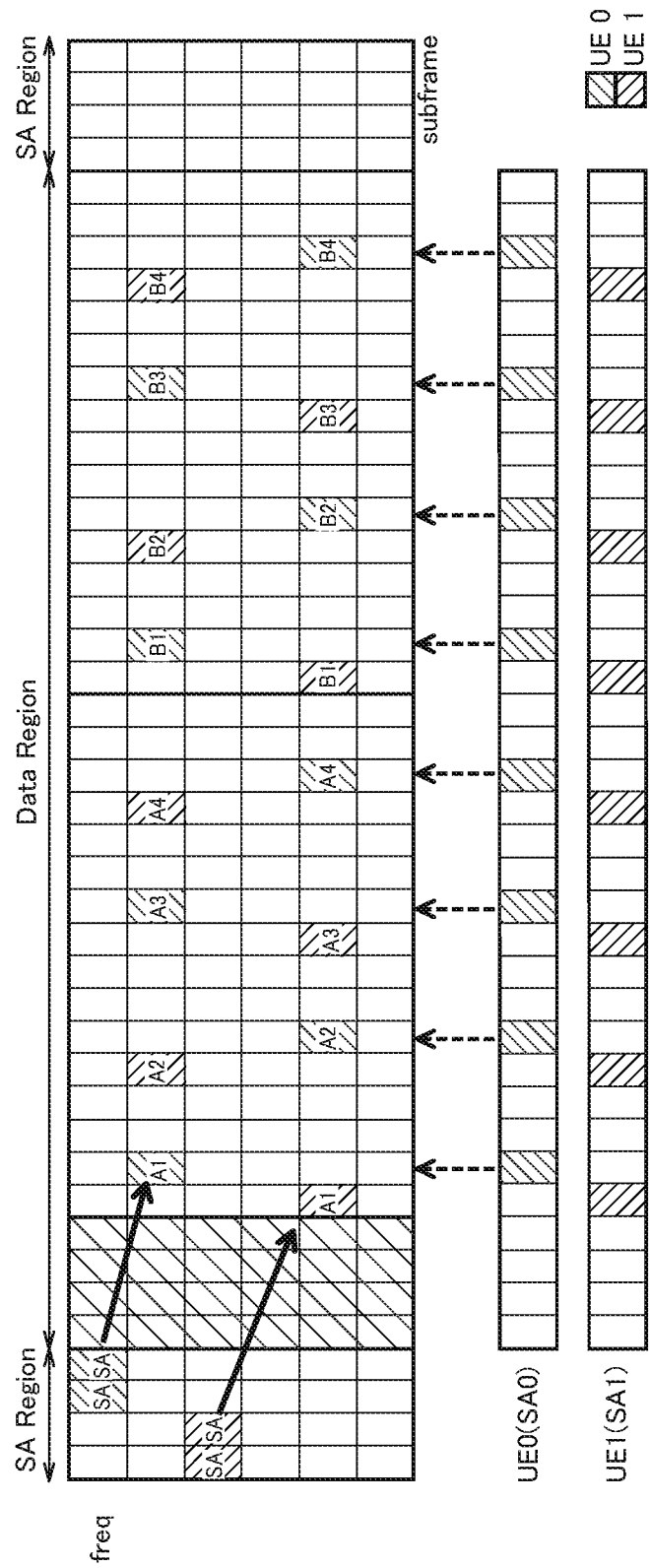
FIG. 7 is a diagram showing an assignment example of a data resource in Mode 1 according to the first embodiment.

FIG. 7 is a diagram showing an assignment example of a data resource in the Mode 1. In FIG. 7, each of two transmission-side UEs (a UE 0, a UE 1) is assumed to transmit SA and user data.

As shown in FIG. 7, an SA region (SA Region) that is a region to which an SA resource may be assigned and a data region (Data Region) that is a region to which a data resource may be assigned are configured in a time division manner.

In the example of FIG. 7, one SA region has the time length of four subframes. Further, the SA region and the data region are divided into a plurality of frequency resource units in the frequency direction. In the example of FIG. 7, the SA region and the data region have the frequency width of six frequency resource units.

A periodic assignment pattern is applied to assignment in the time direction of a data resource in the Mode 1. Specifically, a period in the time direction of a data resource is determined in accordance with a period in the "T-RPT" in SA. A time position to be a starting point of the periodic assignment is determined by an offset in the "T-RPT" in SA.

Further, a position in the frequency direction of a data resource is determined depending on the "Frequency position of data resource" in SA. A frequency hopping pattern of a data resource is determined depending on the "Hopping flag" in SA.

Figure 8:
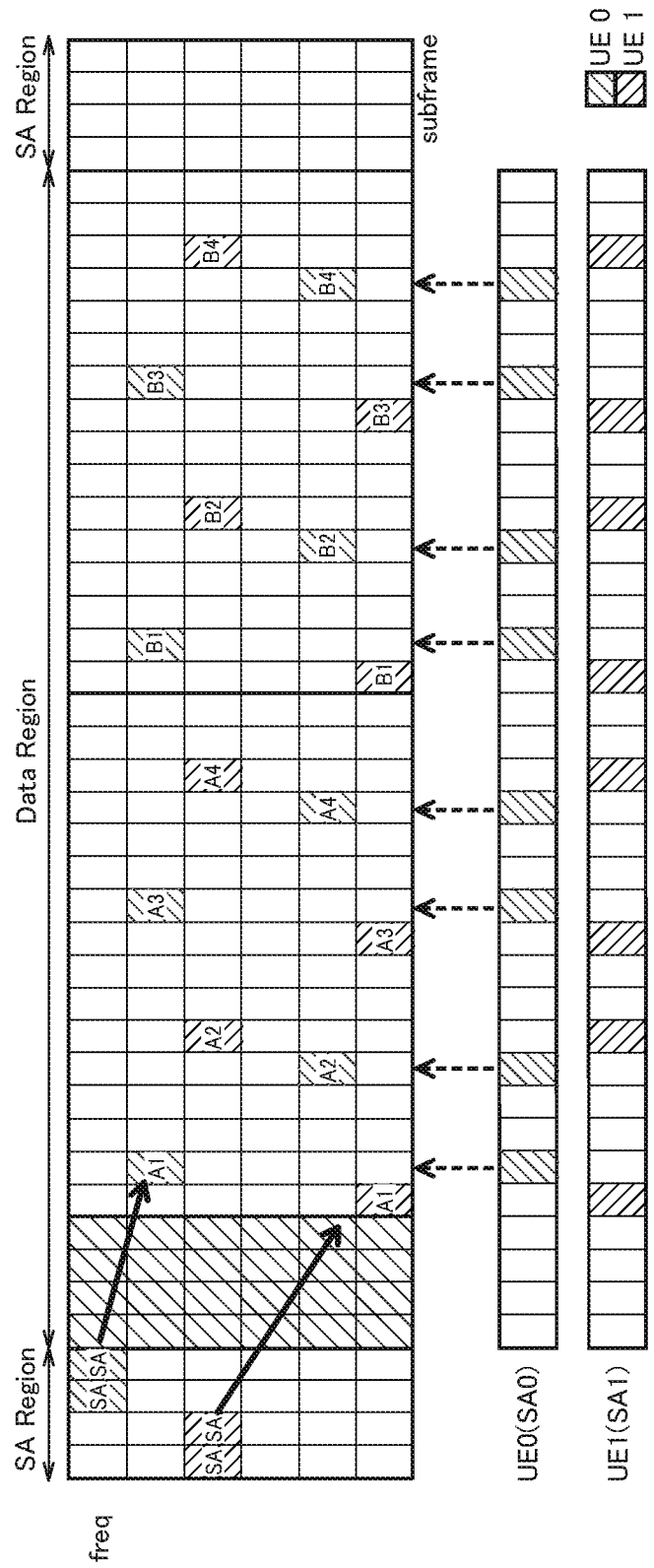
FIG. 8 is a diagram showing an assignment example of a data resource in Mode 2 according to the first embodiment.

FIG. 8 is a diagram showing an assignment example of a data resource in the Mode 2. Here, a difference from an assignment example of a data resource in the Mode 1 will be mainly described.

As shown in FIG. 8, an SA region and a data region are configured in a time division manner.

A random assignment pattern is applied to assignment in the time direction of a data resource in the Mode 2. A assignment pattern is determined on the basis of, for example, information indicating a pseudo random sequence in the "T-RPT" in SA, ($C_{init\_D2D}$), and the "UE ID" in SA. As the pseudo random sequence, for example, a Gold sequence is used.

For example, a seed $C_{init}$ of a pseudo random sequence is calculated by the following calculation formula of Equation 1. At this point, the UE ID is assumed to be 8 bits.

$$c_{init} = c_{init\_D2D} \cdot 2^N \pm \text{UEID}(N=8) \quad \text{[Equation 1]}$$

Further, a subframe $t_k$ that performs the k-th transmission (or reception) is calculated by the following calculation formula of Equation 2.

$$t_k = \Sigma_{i=0}^{N-1} c(Nk+i) \cdot 2^i t_0 \text{ where } N = \lceil \log_2(M) \rceil \quad \text{[Equation 2]}$$

Wherein, M is the number of candidate subframes in the data region. Further, when an overlap is generated in the calculated subframe $t_k$, or when the calculated subframe $t_k$ is greater than or equal to M, the subframe $t_k$ is ignored.

FIG. 9 is a diagram showing the subframe $t_k$ calculated by the calculation formula of the Equation 2. In FIG. 9, an example is shown in which M=20 and N=5. As shown in FIG. 9, in the pseudo random sequence (Random sequence) corresponding to a seed $C_{init}$, "13", "13", "31", "5", "7", and "1" are calculated as subframes $t_k$. The "1st", "5th", "7th", and "13th" subframes are selected as subframes that perform transmission (or reception) since the second "13", and "31" are ignored.

(5) Conclusion of First Embodiment

In the first embodiment, SA includes the "Mode 1/Mode 2 flag" that identifies the assignment mode is which one of the Mode 1 and the Mode 2. This enables the contents of the "T-RPT" indicating an assignment pattern in the time direction of a data resource to vary depending on the assignment mode.

Further, when the assignment mode is the Mode 1, the UE 100 #1 transmits the information on the periodic assignment pattern of a data resource as the "T-RPT". This enables user data to be stably transmitted and received by using the data resource designated by the eNB 200. Further, when user data that should be transmitted and received is assumed to be audio data, the audio data is generated periodically. Thus, by assigning a data resource periodically, the audio data is allowed to be transmitted and received at a low delay.

On the other hand, when the assignment mode is the Mode 2, the UE 100 #1 transmits information on a random assignment pattern of a data resource as "T-RPT". This allows reduction of a possibility in which a data resource is overlapped in the time direction for a plurality of transmission-side UEs even in the case of using a data resource that is not designated by the eNB 200.

In particular, in D2D communication, when a reception-side UE receives a plurality of user data with a large power difference at the same time, power leak-in (in-band emission) in the frequency direction is generated, and the reception quality of desired user data is likely to be deteriorated. Thus, assigning a data resource randomly in the time direction enables randomization of an effect of such interference and suppression of deterioration in the reception quality.

[Modification of First Embodiment]

In the first embodiment described above, a periodic assignment of a data resource is performed in the Mode 1, a random assignment of a data resource is performed in the Mode 2.

However, selectively using such periodic assignment and random assignment may be performed regardless of the assignment mode.

In this modification, instead of the "Mode 1/Mode 2 flag" described above, a periodic/random identification flag is used. The periodical/random identification flag is a flag that identifies the "T-RPT" is which one of the first information and the second information. Here, the first information is information on a periodic assignment pattern of a data resource (for example, information indicating a period and an offset). The second information is information on a random assignment pattern of a data resource (for example, information indicating a pseudo random sequence).

According to this modification, selectively using the periodical assignment and the random assignment of a data resource is allowed to be performed regardless of the assignment mode.

Second Embodiment

A difference of a second embodiment from the first embodiment will be mainly described. The second embodiment is an embodiment concerning assignment of an SA resource.

UE 100 according to the second embodiment supports D2D communication. The UE 100 performs repetition of the same SA (control information) using first and second SA resources (first and second control resources) allocated continuously or discontinuously in a time direction, in SA region having a predetermined time length and a predetermined frequency bandwidth. The UE 100 determines positions of the first and second SA resources in the time direction such that the second SA resource does not overlap with a SA resource of another UE 100 in the time direction, even if the first SA resource overlaps with the SA resource of the another UE 100 in the time direction.

Specifically, the UE 100 #1 which is a transmission-side UE, performs repetitive transmission (Repetition) of SA by using a plurality of SA resources which are assigned continuously or discontinuously in the time direction in an SA region having a predetermined time length and a predetermined frequency width. To the repetitive transmission, for example, application of Chase combining of a redundancy version 0 is allowed. In this case, the same SA is transmitted in initial transmission and retransmission. In the second embodiment, description will be provided for an example in which the number of Repetitions is twice, that is, retransmission is performed only once for one initial transmission.

For example, an assignment pattern in the time direction of a plurality of SA resources is selected from among a plurality of predefined assignment patterns. Each of the plurality of assignment patterns is configured so that, even if some SA resources overlap with another assignment pattern in the time direction, the remaining SA resources do not overlap with the other assignment pattern in the time direction. An entity that selects an assignment pattern from among the plurality of assignment patterns is, for example, the eNB 200 in the Mode 1, and the UE 100 #1 in the Mode 2.

Figure 10A:
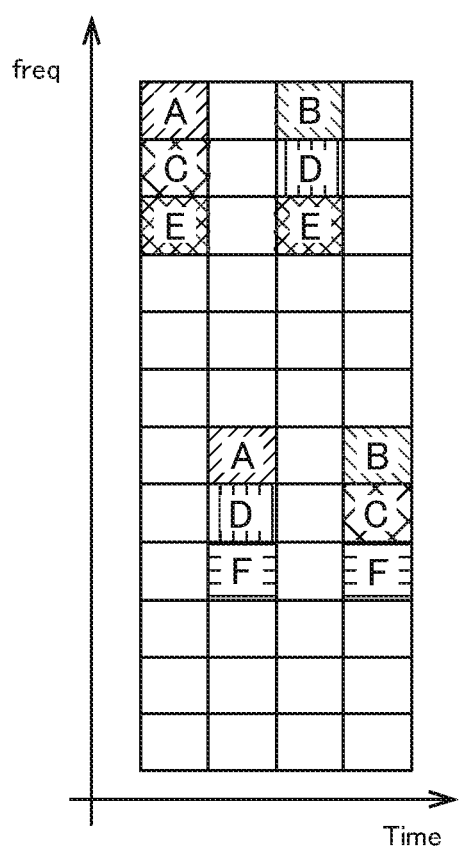
FIGS. 10(A) and 10(B) are diagrams showing an assignment example of an SA resource when an SA region has a time length of four subframes according to the second embodiment.
Figure 10B:
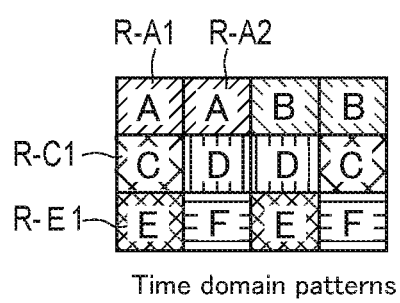

FIGS. 10(A) and 10(B) are diagrams showing an assignment example of an SA resource when an SA region has the time length of four subframes. As shown in FIG. 10 (A), six patterns of assignment patterns A to F are predefined as assignment patterns of an SA resource. Further, frequency hopping of an SA resource is applied.

As shown in FIG. 10 (A), the UE 100#1 determines positions of the first and second SA resources in a frequency direction such that the second SA resource is shifted by one-half of the predetermined frequency bandwidth (frequency bandwidth of control region) than the first SA resource. An example in FIG. 10 (A) shows the predetermined frequency bandwidth equals to a frequency bandwidth of twelve resource blocks. For example, when focusing on "A" SA resource of FIG. 10 (A), a resource block of the second transmission is shifted by six resource blocks than a resource block of the first transmission. In such a manner, the UE 100#1 determines a first resource bock used for the first SA resource and a second resource bock used for the second SA resource such that the second SA resource is shifted by one-half of the predetermined frequency bandwidth than the first SA resource.

As shown in FIG. 10 (B), each assignment pattern is configured so that, when some SA resources overlap with another assignment pattern in the time direction, the remaining SA resources do not overlap with the other assignment pattern. Focusing on an assignment pattern A, an SA resource R-A1 corresponding to a first subframe overlaps with an SA resource R-C1 of an assignment pattern C and an SA resource R-E1 of an assignment pattern E. However, an SA resource R-A2 corresponding to a second subframe does not overlap with the assignment patterns C and E. In other words, the UE 100#1 determines a first subframe used for the first SA resource and a second subframe used for the second SA resource such that the second SA resource does not overlap with the SA resource of the another UE 100 in the time direction, even if the first SA resource overlaps with the SA resource of the another UE 100 in the time direction.

Therefore, even if the transmission timing of the first transmission of UE 100#1 overlaps with another UE 100, the transmission timing of the second transmission of UE 100#1 does not overlap with the another UE 100. As such, the UE 100#1 can receive an SA transmitted in the second by the another UE 100. Moreover, even when the UE 100 #2 (the reception-side UE) is not capable of decoding the SA of the SA resource R-A1 due to power leak-in (in-band emission) by the SA resource R-C1 or the SA resource R-E1, there is a high possibility that the UE 100 #2 is capable of decoding the SA of the next SA resource R-A2. Therefore, the efficiency of repetitive transmission of SA is allowed to be improved.

FIGS. 11(A) and 11(B) are diagrams showing an assignment example of an SA resource when an SA region has the time length of ten subframes. As shown in FIG. 11(A), assignment patterns A to 0 are predefined as assignment patterns of an SA resource. In this way, as the time length of an SA region is longer, available assignment patterns are allowed to be increased.

Further, as shown in FIG. 11(B), each assignment pattern is configured so that, even if some SA resources overlap with another assignment pattern in the time direction, the remaining SA resources do not overlap with the other assignment pattern. Focusing on the assignment pattern A, the SA resource R-A1 corresponding to the first subframe overlaps with an SA resource R-F1 of an assignment pattern F and an SA resource R-K1 of an assignment pattern K. However, the SA resource R-A2 corresponding to the second subframe does not overlap with the assignment patterns F and K.

Other Embodiments

In the first embodiment and the modification thereof described above, description is provided for an example of performing a random assignment of a data resource by using a pseudo random sequence. However, instead of the pseudo random sequence, an orthogonal sequence may be used.

As to SA, the "Resource pool ID for Mode 2" may include information indicating a resource pool selected by the UE 100 #1.

Furthermore, in the embodiment described above, although an LTE system is described as an example of a mobile communication system, the present disclosure is not limited to the LIE system, and may be applied to a system other than the LTE system.

[Additional Statement 1]

Hereinafter, additional descriptions of the above embodiments will be described.

The contents of scheduling assignments (SA) for D2D broadcast communication was discussed and agreed as follows.

MCS indication is provided dynamically per SA with 5 bits, using the existing 5-bit UL MCS table.
64QAM shall not be used for D2D transmission.
The MCS indication is included in SA.
The MCS for SA is fixed in the specifications.
The modulation used for SA is QPSK.

The SA includes an ID of N bits (N<=16, working assumption N=8) with at least the following purpose: to enable the UE to reduce the probability of decoding of data packets the UE is not interested in.

FFS what the ID is derived from.

Not precluding scrambling SA CRC.

Frequency position of data resource is explicitly signalled in SA. Can be revisited after agreeing other content of SA if it turns out that "too many" retransmissions are required for the SA and/or design of SA and/or associated DCI is not feasible, or if data resource collision turns out to be a significant problem.

6 bits are used to indicate D2D reception timing adjustment in SA (at least for Mode1), giving values of TA spaced at intervals corresponding to the extended CP length with a cell radius of 100 km.

The same time resource pattern of transmission (T-RPT) is used for each MAC PDU on a per-UE basis.

FFS whether a transmitting UE uses all the transmission opportunities given by the T-RPT in the SA.

T-RPT in the SA indicates:

Transmission interval(s) between transmission of multiple MAC PDUs.

Number of transmissions of a given MAC PDU (if more than one value is possible).

Resources for transmission of each MAC PDU.

T-RPT has no more than 256 values.

Time indices (parameters within T-RPT) are defined only for the sub-frames included in the resource pool for Mode 2 and Mode 1 (if a resource pool is defined) and available sub-frames for TDD carriers.

FFS whether (and if so how) the frequency resource might be jointly signalled with time domain info.

FFS whether the interpretation of the bits is UE-specific or common.

For both Mode 1 and Mode 2, resource for single transmission (i.e. 1 subframe) of SA is 1-1-S between 1 PRB-pair and 2 PRB-pair.

Retransmissions of SA are supported. FFS whether Chase combining.

Total number of transmissions of SA is FFS between: fixed to a single value in specifications, and (pre-)configurable among two values.

Number(s) of SA subframes in the SA resource pool FFS.

Given a certain SA resource pool and time/frequency resource that is used for a transmission of an SA message by a UE, the other time/frequency resources used by the same UE for transmission(s) of the same SA message within an SA resource period are known and fixed in the specification.

Details FFS.

FFS on whether/how to minimize the collision of transmissions in Mode 2.

(SA's Contents)

In this section, we consider the SA's contents. Table 2 shows the details of SA's contents.

TABLE 2

| Contents | Bits | |
|---|---|---|
| UE ID (TX UE ID or Target ID) | 8 bits | |
| MCS | 5 bits | |

TABLE 2-continued

| Contents | Bits | |
|---|---|---|
| Frequency position of data resource (if needed) | 13 bits | reuse of DCI format 0 resource allocation |
| T-RPT Transmission interval(s) between transmission of multiple MAC PDUs | 2 bits | 8, 10, 16, 20 |
| Number of transmissions of a given MAC PDU (if more than one value is possible) | 1 bit | 1, 4 |
| Resources for transmission | 5 bits | Mode 1: Offset Mode 2: $c_{init\_D2D}$ |
| TA | 6 bits (FFS) | |
| Mode 1/Mode 2 flag | 1 bit | |
| In-coverage/out of coverage | 1 bit | |
| Hopping flag | 2 bits | reuse of PUSCH hopping |
| Reserved | 4 bits | |
| Total | 48 bits | |

Frequency Allocation

DCI format 0 PUSCH should be reused for the frequency allocation indication. This allows a simpler design.

T-RPT

Mode 1 and Mode 2 should have different T-RPTs. Mode 1 doesn't have a transmission pool and Mode 2 has a transmission pool. In Mode 1 periodic allocation is used and in Mode 2 the random allocation is used. In order to distinguish between the two modes we support Mode 1/Mode 2 flag in the SA.

Proposal 1: Mode 1 and Mode 2 should have different T-RPTs. In Mode 1 periodic allocation is used and in Mode 2 the random allocation is used.

Proposal 2: Mode 1/Mode 2 flag should be supported in the SA.

In-Coverage/Out of Coverage

If the in-coverage UE is transmitting a D2DSS and do not detect an out-of-coverage SA then in-coverage UE can stop D2DSS transmissions. This feature can be included in the future releases.

Hopping Flag

PUSCH hopping parameters are reused.

RV

When the number of retransmission is fixed, RV index pattern can be fixed.

Proposal 3: RV pattern is fixed in the specification, (0, 2, 3, 1) for each retransmission. RV indication is not needed.

(SA's Allocation in SA Resource Pool)

In this section, we consider the SA's allocation in SA resource pool.

Frequency Hopping

SA's frequency hopping is fixed in the specification and based on PUSCH hopping. The same configuration is used for all UEs in a given SA pool.

Proposal 4: SA's frequency hopping is fixed in the specification and based on PUSCH hopping. The same configuration is used for all UEs in a given SA pool.

SA's Frequency Resource

From the link level performance perspective, the resource for single transmission should be 2 PRB-pairs.

Proposal 5: From the link level performance perspective, the resource for single transmission should be 2 PRB-pairs.

SA's Repetition

SA's repetition should be 1 or 2. Chase combining should be supported for SA and RV=0.

Proposal 6: SA's repetition should be 1 or 2. Chase combining should be supported for SA and RV=0.

SA's Time and Frequency Allocation

In Mode 1 the eNB configured the time and frequency resources for the SA transmissions. In Mode 2 the UEs autonomously select the time and frequency resources for the SA transmissions.

SA's Time Allocation

Figure 12A:
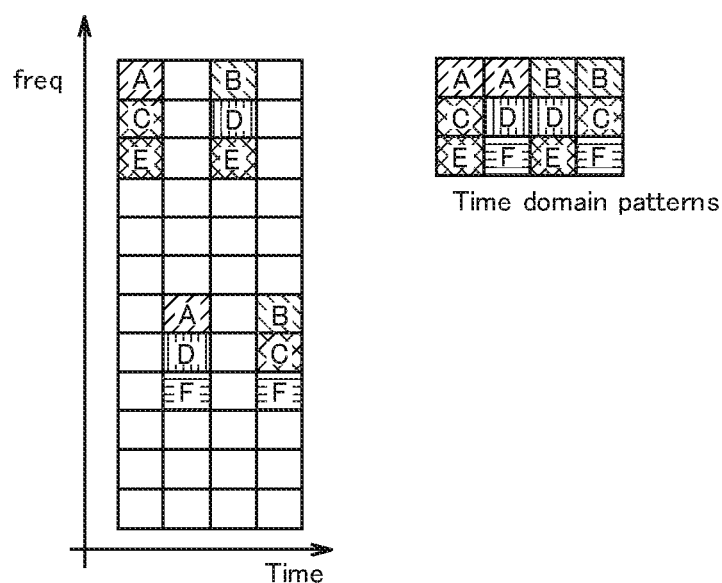
FIGS. 12(A) and 12(B) show examples of predefined 2 times repetitive time pattern for SA subframe 4 or 10 according to an additional statement 1.
Figure 12B:
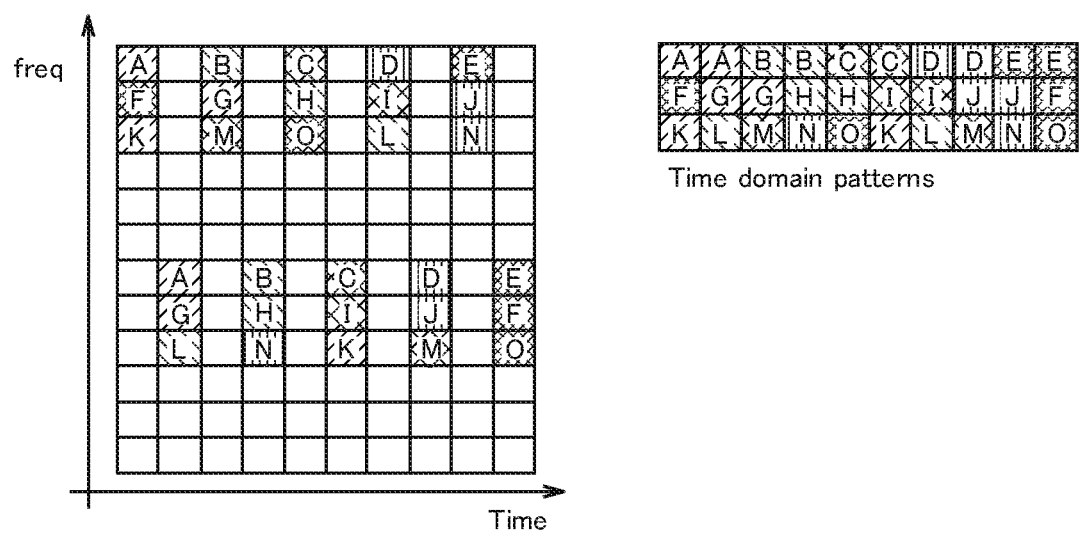

SA's time allocation is predefined. FIGS. 12(A) and 12(B) show examples of predefined 2 times repetitive time pattern for SA subframe 4 or 10. The design shown in the figure is based on overcoming the half-duplex constraint. Since a SA transmitting UE cannot receive another SA from another UE at the same time, the retransmissions of SAs are such that same UEs do not retransmit their respective SAs again at the exact same resource.

Proposal 7: SA's timing patterns should be considered to mitigate half-duplex constraints.

[Additional Statement 2]

(SA and Data Linkage)

Figure 13:
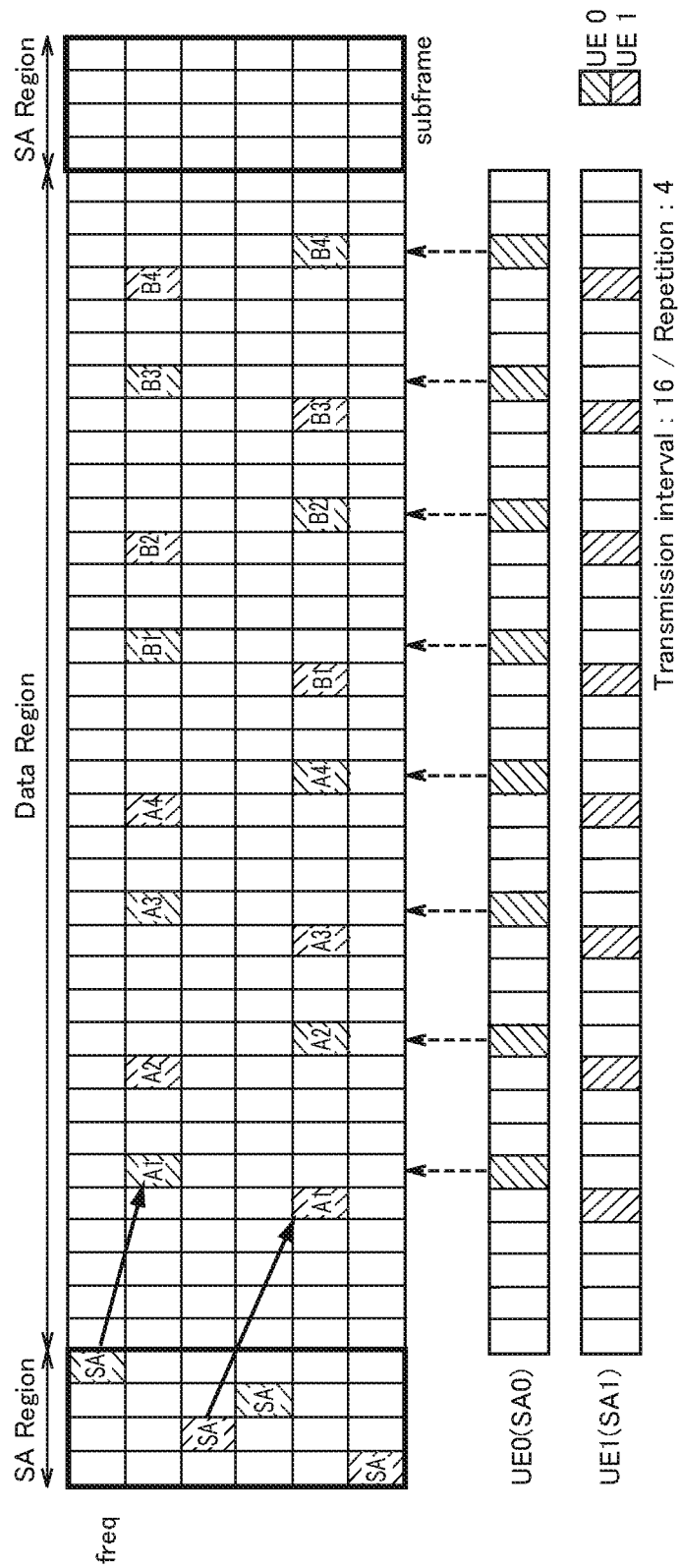
FIG. 13 shows the time and frequency domain allocations according to an additional statement 2.

In this section we describe the linkage between the SA and the data allocation. FIG. 13 shows the time and frequency domain allocations.

Frequency Domain Allocation

In order to keep a simple design we propose PUSCH hopping to be reused for D2D communications.

Proposal 1: PUSCH hopping is reused for frequency allocation for Mode 1 and Mode 2.

Time Domain Data Allocation

For Mode 1 the eNB is responsible for scheduling the D2D UEs; therefore, the eNB should configure the period and offset of Data transmissions. Then the transmitting UE signals the period and offset in the SA.

Proposal 2: For Mode 1 the eNB should configure the period and offset of Data transmission. The period and offset is then signaled in the SA.

[Additional Statement 3]

(SA and Data Linkage)

In this section we describe the linkage between the SA and the data allocation. FIG. 1 shows the time and frequency domain allocations.

Frequency Domain Allocation

As discussed in the above additional statements, in order to keep a simple design we propose PUSCH hopping is reused.

Proposal 1: PUSCH hopping is reused for frequency allocation for Mode 1 and Mode 2.

Time Domain Data Allocation

Figure 14:
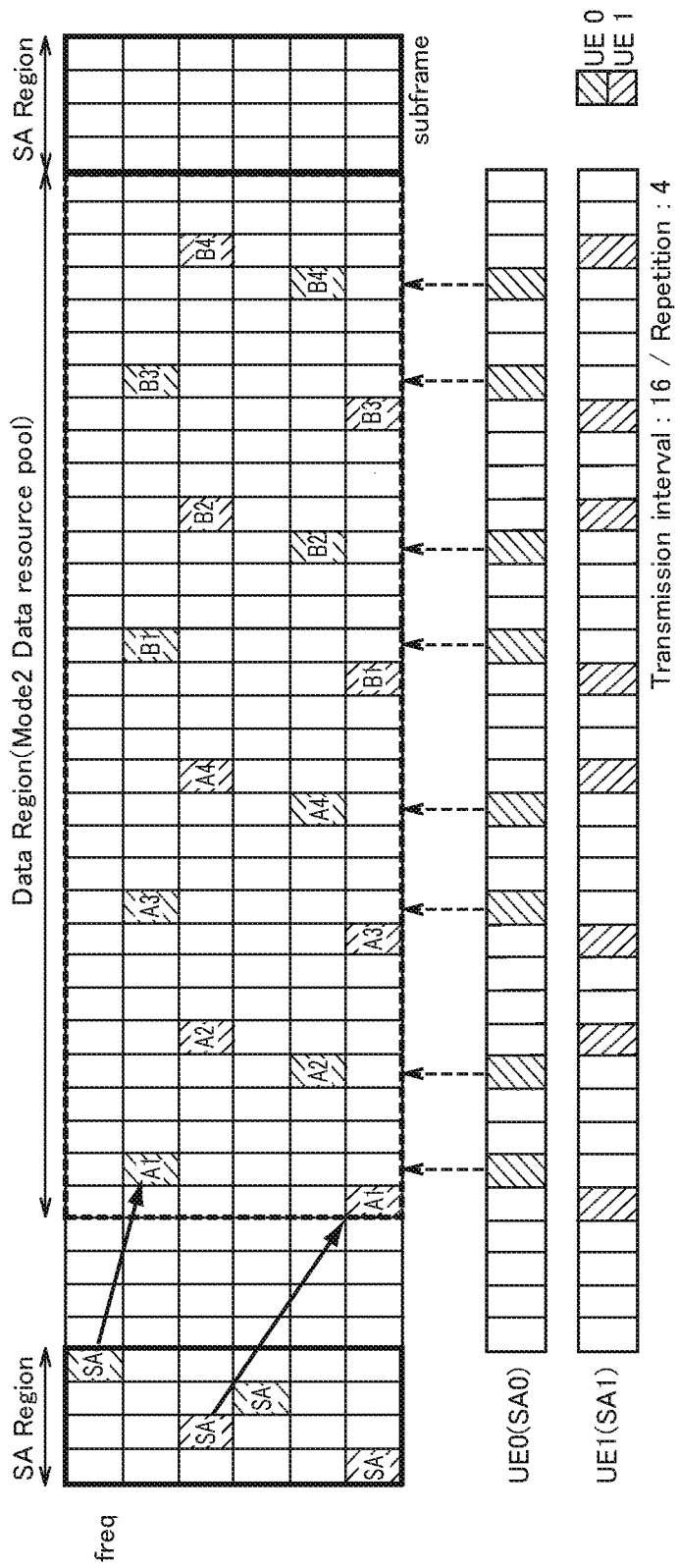
FIG. 14 shows the time and frequency domain allocations according to an additional statement 3.

Due to half-duplex constraint and to reduce the performance degradation due to the in-band emissions the data can be randomized in time domain. This randomization is based on UE ID and $c_{init\_D2D}$ in the SA. As shown in FIG. 14, for example, a UE can randomly select 4 subframes out of 16 to transmit its D2D data. Rel.8 Gold sequence [TS36.211 7.2] is reused for Mode 2 time allocation. $c_{init}$ is derived from UE ID and $c_{init\_D2D}$ in the SA.

$$c_{init} = c_{init\_D2D} \cdot 2^N \pm UEID (N=8)$$ [Equation 3]

It is assumed Mode 2 Data pool have M candidate subframes.

For the $k^{th}$ transmission subframe $t_k$ is as follows:

$$t_k = \Sigma_{i=0}^{N-1} c(Nk+i) \cdot 2^i t_0 \text{ where } N=\lceil \log_2(M) \rceil$$ [Equation 4]

If there is a collision or $t_k \geq M$, then that $t_k$ is ignored.

Figure 15:
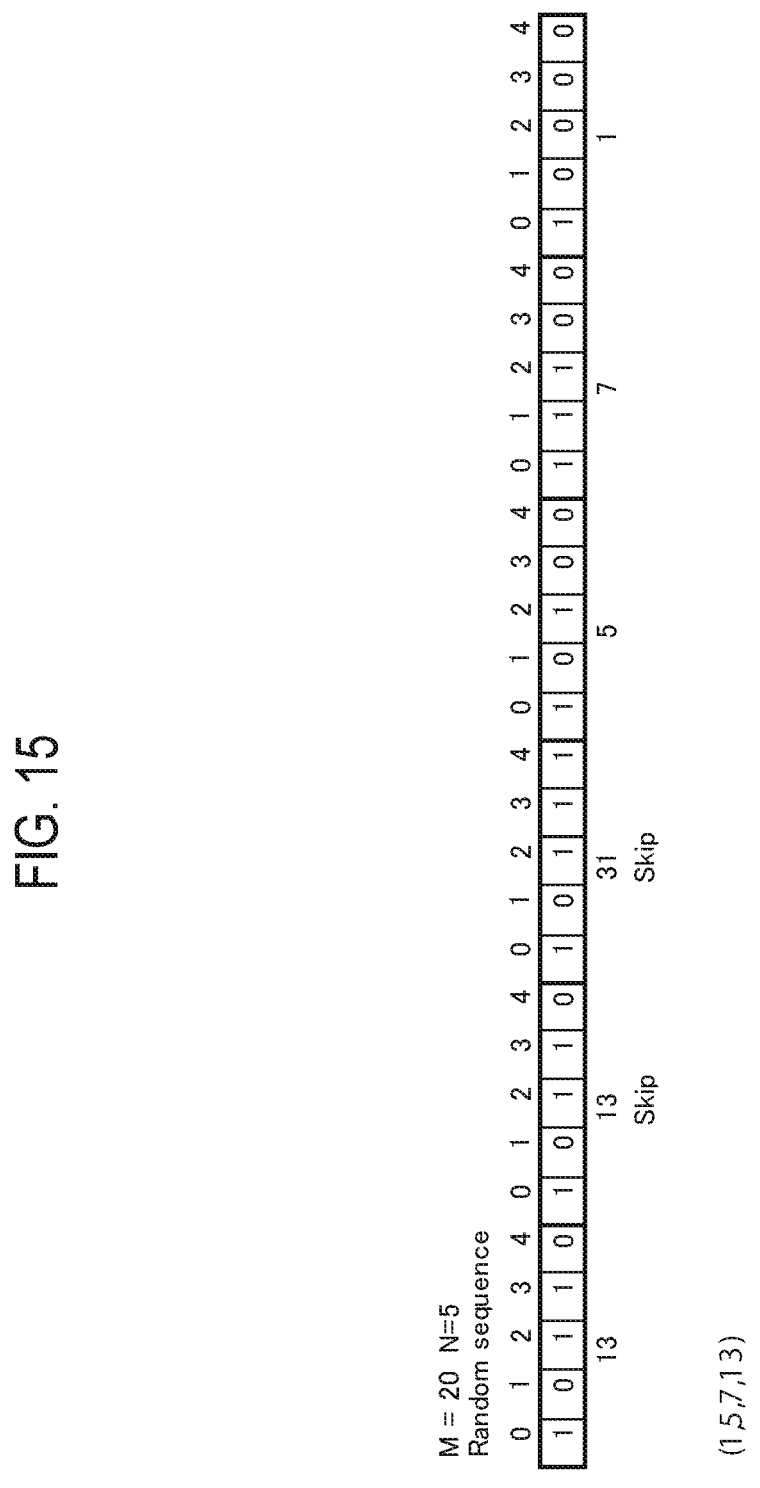

FIG. 15 shows an example with M=20.

Proposal 2: Due to half-duplex constraint and to reduce the performance degradation due to the in-band emissions the data should be randomized in time domain.

Proposal 3: Time domain randomization is based on UE ID and $c_{init\_D2D}$.

[Additional Statement 4]

(Design Considerations of Repetition)

Figure 16:
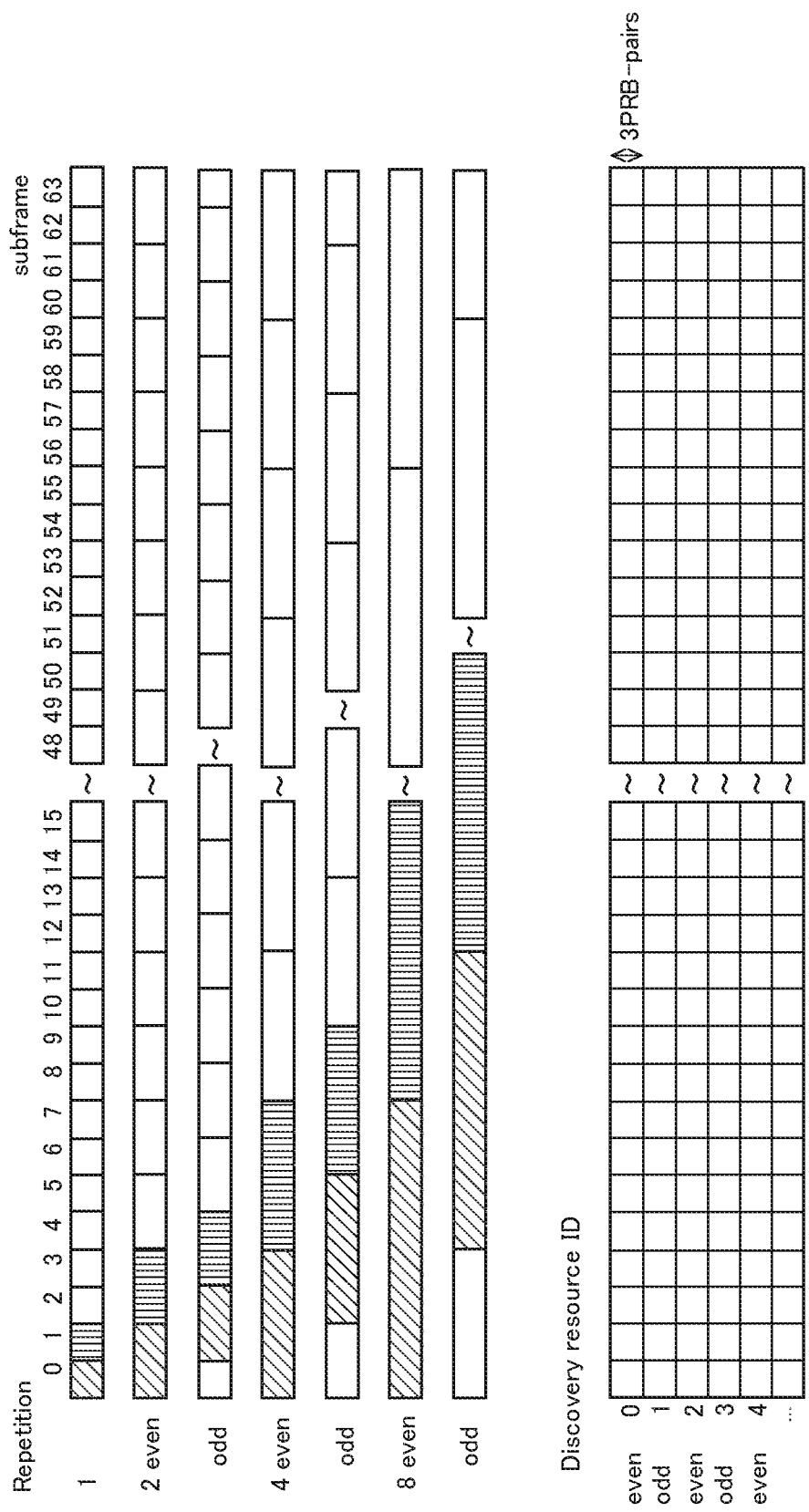
FIG. 16 shows repetition resource according to an additional statement 4.

In this section we describe the time domain allocation of Type 1 discovery. In order to reduce complexity we suggest time contiguous allocation repetitions. The repetition pattern could include {1, 2, 4 and 8} repetitions and even/odd patterns applied to even and odd discovery resource IDs as shown in FIG. 16. Furthermore, the RV index could be pre-defined pattern, (0, 2, 3, 1). In addition, we also support the PUSCH hopping pattern for the above.

Proposal 1: We propose time contiguous allocation repetitions. The repetition pattern could include {1, 2, 4 and 8} repetitions and even/odd patterns applied to even and odd discovery resource IDs.

Proposal 2: The RV index should support pre-defined (0, 2, 3, 1) pattern.

Proposal 3: PUSCH hopping is reused for Type 1 discovery.

(Repetition Gain)

Figure 17:
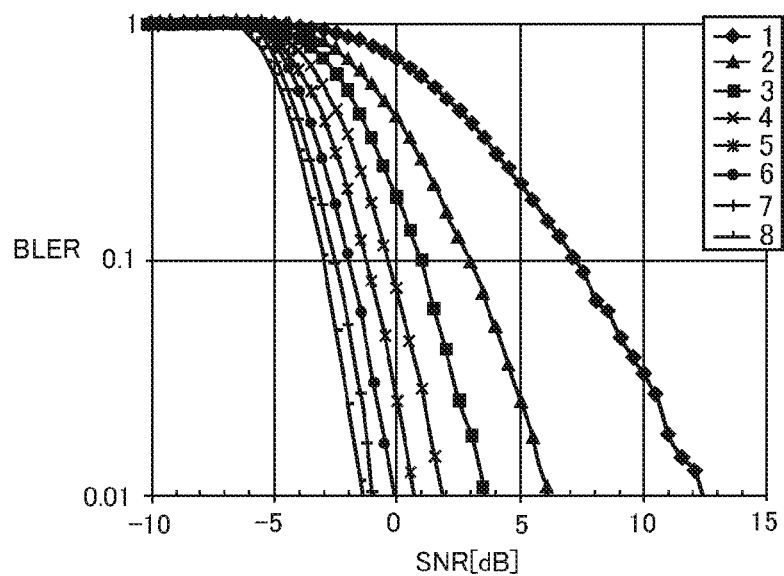
FIG. 17 shows the gain achieved as the number of repetitions increases according to an additional statement 4.

In this section we discuss the gain achieved by repetitions. We assumed the repetitions resources are contiguously allocated in the time domain. Further detailed simulation assumptions are described in Appendix A. FIG. 17 shows the gain achieved as the number of repetitions increases. However, as the data indicates in Table 1 there is a diminishing return in gain as the number of repetitions increases.

TABLE 3

| Number of transmissions | Gain |
| --- | --- |
| 2 | 6.0 dB |
| 3 | 2.6 dB |
| 4 | 1.7 dB |
| 5 | 1.2 dB |
| 6 | 0.8 dB |
| 7 | 0.8 dB |
| 8 | 0.5 dB |

Simulation Assumptions

Figure 18:
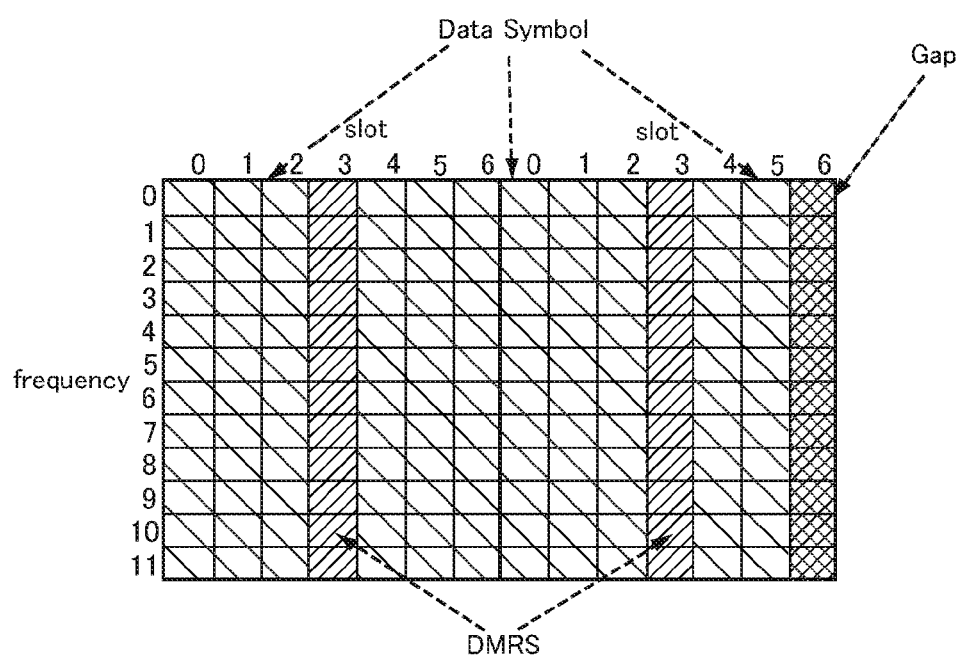
FIG. 18 shows the physical format of D2D Discovery signal according to an additional statement 4.
Figure 19:
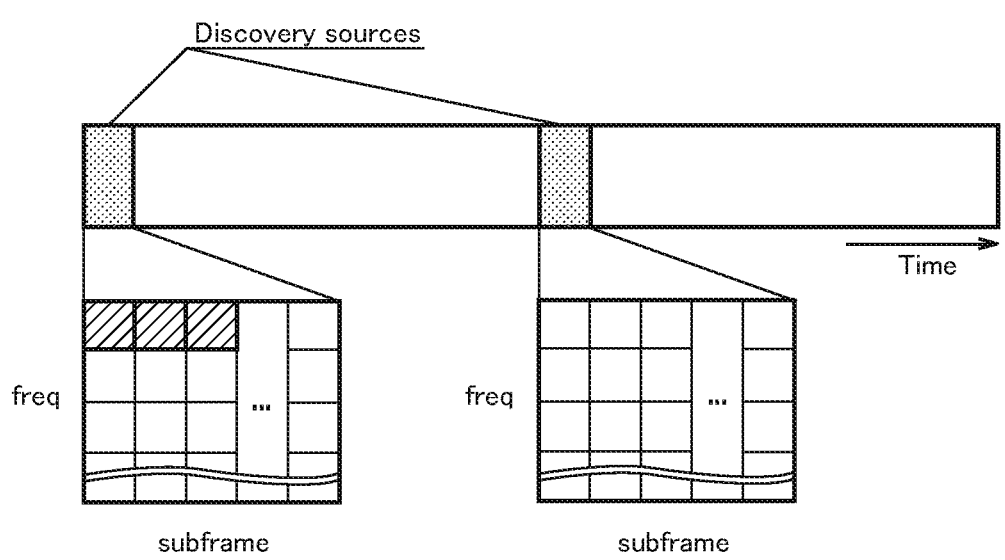
FIG. 19 shows resource allocation for repetition according to an additional statement 4.

The physical format of D2D Discovery signal is shown in FIG. 18. Resource allocation for repetition is shown in FIG. 19. Simulation assumptions are listed in the Table 4.

TABLE 4

| | |
| --- | --- |
| Carrier frequency | 2000 [MHz] |
| System Bandwidth | 10 [MHz] |
| Channel model | ITU-R Umi NLOS w/ dual-mobility |
| Moving direction of Tx UE and Rx UE | Uniform Random (−180-180[deg.]), independently |
| Number of Tx Antennas | 1 |
| Number of Rx Antennas | 2 |
| Number of RB | 3 |
| Modulation | QPSK |
| Bit length | 200 bits |
| Channel coding | Turbo coding |
| CRC | 24 bits |
| RV index | 0 -> 2 -> 3 -> 1 |
| UE velocities pairs (Tx, Rx) | (3, 3) |
| Channel Estimation | ZF with linear interpolation in time |
| Receiver Type | MRC |

The entire contents of U.S. Provisional Application No. 62/035,174 (filed on Aug. 8, 2016) are incorporated herein by reference.

INDUSTRIAL APPLICABILITY

The present disclosure is useful for communications field. The invention claimed is:

1. A user terminal that supports device-to-device (D2D) communication, comprising:
a controller configured to perform D2D transmission using repetition of same D2D control information using first and second D2D control resources allocated continuously or discontinuously in a time direction, in a D2D control region having a predetermined time length and a predetermined frequency bandwidth, wherein
the controller is configured to determine positions of the first and second D2D control resources in the time direction, wherein the second D2D control resource does not overlap with a D2D control resource of another user terminal in the time direction, even if the first D2D control resource overlaps with the D2D control resource of the another user terminal in the time direction, and
the controller is configured to determine positions of the first and second D2D control resources in a frequency direction, wherein the second D2D control resource is shifted by one-half of the predetermined frequency bandwidth than the first D2D control resource.

2. The user terminal according to claim 1, wherein
each of the first and second control resources has a frequency bandwidth of one resource block and a duration of one subframe,
the controller is configured to
determine a first resource bock used for the first control resource and a second resource bock used for the second control resource, wherein the second control resource is shifted by one-half of the predetermined frequency bandwidth than the first control resource, and
determine a first subframe used for the first control resource and a second subframe used for the second control resource, wherein the second control resource does not overlap with the control resource of the another user terminal in the time direction, even if the first control resource overlaps with the control resource of the another user terminal in the time direction.

3. A processor for controlling a user terminal that supports device-to-device (D2D) communication, the processor configured to execute:
a process of performing D2D transmission using repetition of same D2D control information using first and second D2D control resources allocated continuously or discontinuously in a time direction, in a D2D control region having a predetermined time length and a predetermined frequency bandwidth;
a process of determining positions of the first and second D2D control resources in the time direction, wherein the second D2D control resource does not overlap with a D2D control resource of another user terminal in the time direction, even if the first D2D control resource overlaps with the D2D control resource of the another user terminal in the time direction, and
a process of determining positions of the first and second D2D control resources in a frequency direction, wherein the second D2D control resource is shifted by one-half of the predetermined frequency bandwidth than the first D2D control resource.

* * * * *